United States Patent
Chiu et al.

[11] Patent Number: 6,021,669
[45] Date of Patent: *Feb. 8, 2000

[54] CONTAINER OF COOLANT

[75] Inventors: Shih-Hsun Chiu, Hsinchu Hsien; Li-Chung Lee, Iian Hsien; Wei-Sheng Chia, Hua-Lien; Patrick Cheng, Kaoshiung Hsien, all of Taiwan

[73] Assignee: United Microelectronics Corp., Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 09/073,874

[22] Filed: May 7, 1998

[30] Foreign Application Priority Data

Apr. 3, 1998 [TW] Taiwan ................................ 87205035

[51] Int. Cl.7 ...................................................... G01F 23/02
[52] U.S. Cl. ............................................... 73/328; 73/323
[58] Field of Search ............................ 73/323, 326, 328; 62/125, 127, 129

[56] References Cited

U.S. PATENT DOCUMENTS

| 189,778 | 4/1877 | Paquette | 73/323 |
|---|---|---|---|
| 1,902,276 | 3/1933 | Bull | 73/323 |
| 3,525,231 | 8/1970 | Armstrong | 73/323 |
| 3,592,018 | 7/1971 | Widdowson . | |
| 4,107,999 | 8/1978 | Lang | 73/326 |
| 4,220,048 | 9/1980 | Grepiotis et al. | 73/323 |
| 4,888,980 | 12/1989 | DeRome | 73/49.2 |

FOREIGN PATENT DOCUMENTS 348177  5/1931  United Kingdom ................ 73/326

*Primary Examiner*—Hezron Williams
*Assistant Examiner*—Willie Morris Worth
*Attorney, Agent, or Firm*—Oblon, Spivak, McClelland, Maier & Neustadt, P.C.

[57] ABSTRACT

A container of coolant used in a NIKON™ stepper is utilizing a transparent duct mounted on a side of the container of coolant to check a liquid level. The container of coolant can be conventional or other similar container of coolant.

10 Claims, 3 Drawing Sheets

CONTAINER OF COOLANT

CROSS-REFERENCE TO RELATED APPLICATION

This application claims the priority benefit of Taiwan application serial No. 87205035, filed Apr. 3, 1998, the full disclosure of which is incorporated herein by reference.

BACKGROUND OF THE INVENTION

1. Field of the Invention:

This invention relates to a container of coolant for storing a coolant used in a stepper, and more particularly to a container of coolant utilizing a transparent duct mounted on a side of the container of coolant to check a liquid level of the coolant. The transparent duct has got through the container of coolant to let the coolant freely flow through it.

2. Description of Related Art:

The products of integrated circuits (ICs) are existing everywhere in our daily life but the fabricating procedure of the products of ICs is very complicated. Generally, it needs a few hundreds of different steps and takes one or two months to compete a production. The industry of ICs has four main categories including the design of ICs, the fabrication of a wafer, the test of a wafer and the package of a wafer. Therefore, the industry of ICs not only needs a high technology of science but also needs a great amount of funds to support and keep the continuous developing. This causes a high risk on the industry of ICs.

From the point of view of the fabrication of a wafer, it further includes oxidation, diffusion, deposition, pattern, etching and so on. In the fabricating procedure of photolithography, so far, a stepper is usually applied for the fabrication of a wafer.

While a stepper is under the operation for fabricating the wafer, it is very important to keep the temperature and the humidity of the stepper in a certain acceptable range. If the temperature and the humidity were out of the range, the stepper would produce some errors in the fabricating procedure or even could breakdown. Therefore, the conventional stepper has made use of coolant for maintaining the temperature and the humidity.

Freon ($CCl_2F_2$), a coolant, is odorless, nonpoisonous, nonflammable and non-corrosive so that freon is a good candidate of coolant and, thus, is widely used in the stepper, which has a container of coolant to avoid the problems due to the temperature and humidity having been out of acceptable range.

FIG. 1 illustrates the top view of a conventional container of coolant. FIG. 2 illustrates the front view of a conventional container of coolant. FIG. 3 illustrates the perspective view of an exploded conventional container of coolant.

Referring to FIGS. 1–3, a conventional container of coolant 9 used in a NIKON™ stepper 8 with being mounted on a machines of type I8, I9 and I10. The structure of the container of coolant 9 includes a storing container 10, a metal plate 14 and a washer 12. The storing container 10 is made of stainless steel and is used for storing a coolant. The storing container 10, with a top and a bottom, has a coolant inlet 11 on the top. The coolant inlet 11 is closed by tightly screwing the six screws 16. The screws 16 distributed evenly on the rim of the metal plate 14 are through the metal plate 14 and the washer 12 to be screwed tightly on the storing container 10. The metal plate 14 has an up-lifter 18 around the center to allow the metal plate 14 to be lifted up. The storing container 10 further has four mounting holes 20 on the bottom for allowing the storing container 10 to be mounted on the stepper 8. In addition, the storing container 10 has a circulative output duct 22 and a circulative input duct 24 for connection with a coolant compressor 100 as shown FIG. 2. The coolant compressor 100 processes the coolant and drives the coolant in circulation through the circulative ducts 22, 24.

For the conventional container of coolant 9, it has no way to detect the leakage of coolant. If the leakage happens, the insufficient coolant can easily induce the problems on the stepper 8 and cause the errors.

In conclusion for the conventional container of coolant 9, it has drawbacks such as the amount of coolant left inside the container is not able to be detected. If the leakage happens, the insufficient coolant can easily induce the problems on the stepper 8 and cause the errors.

SUMMARY OF THE INVENTION

It is therefore an objective of the present invention to provide a container of coolant with a transparent duct mounted on the side of the container and being through the container. The container of coolant can store a coolant and let the coolant flow through the transparent duct freely to allow a liquid level of the coolant to be detected. Therefore, the coolant left inside the container of coolant is monitored to avoid the case of insufficient coolant happening to ensure the stepper working properly.

In accordance with the foregoing and other objectives of the invention, the container of coolant of the invention includes a storing container with a top, a bottom, a side and the transparent duct mounted on the side. The transparent duct is through inside of the storing container so that the coolant can freely flow through the transparent duct to allow the liquid level of the coolant to be detected from the outside of the container of coolant.

In forgoing, the transparent duct has a lower open end and an upper open end and is mounted on the side of the storing container vertically or slantingly. The locations of the lower open end and the upper open end should be around the bottom and the top of the storing container, respectively, to sufficiently monitor the liquid level of coolant left inside the storing container.

The container of coolant also includes a coolant inlet, a circulative input duct and a circulative output duct. The coolant inlet for filling the coolant is closed by a metal plate and a washer, which are tightly screwed to the storing container by a number of screws evenly distributed on a rim of the metal plate. The circulative input duct and the circulative output duct are for the connection to the main cooling system located in the stepper.

The methods to close the coolant inlet as described above is not unique but the transparent duct for detecting the liquid level of the coolant in the storing container is the main characteristics of the invention.

BRIEF DESCRIPTION OF DRAWINGS

The invention can be more fully understood by reading the following detailed description of the preferred embodiment, with reference made to the accompanying drawings as follows.

DETAILED DESCRIPTION OF PREFERRED EMBODIMENT

Figure 1:
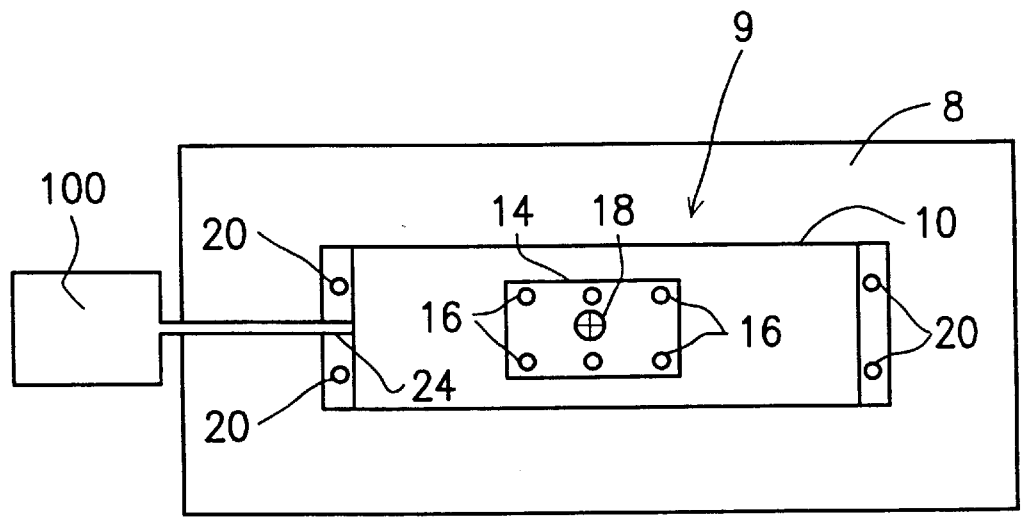
FIG. 1 illustrates the top view of a conventional container of coolant.
Figure 2:
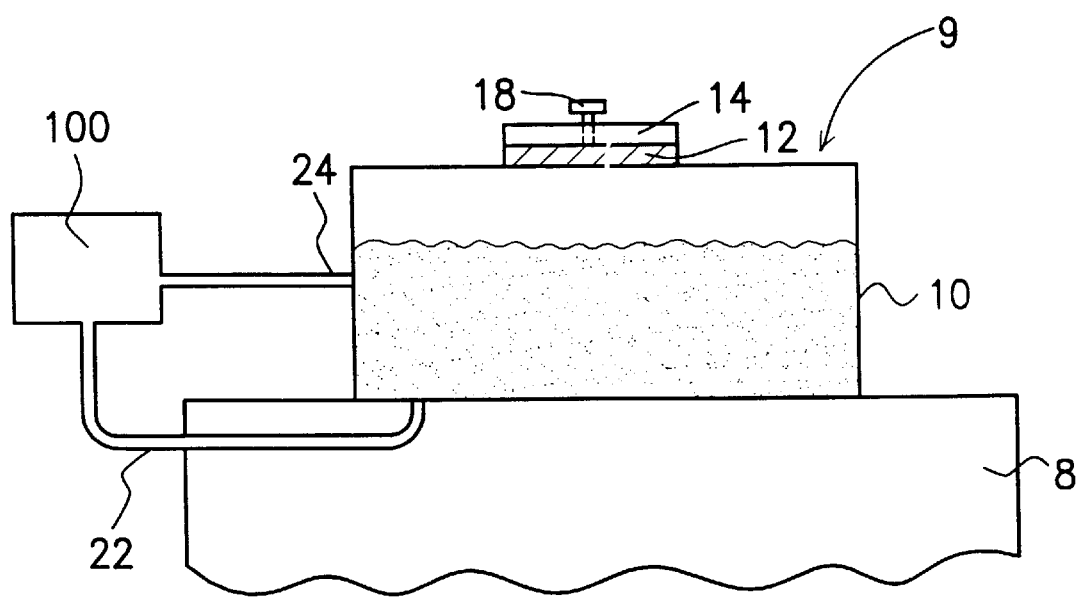
FIG. 2 illustrates the sectional view of a conventional container of coolant.
Figure 3:
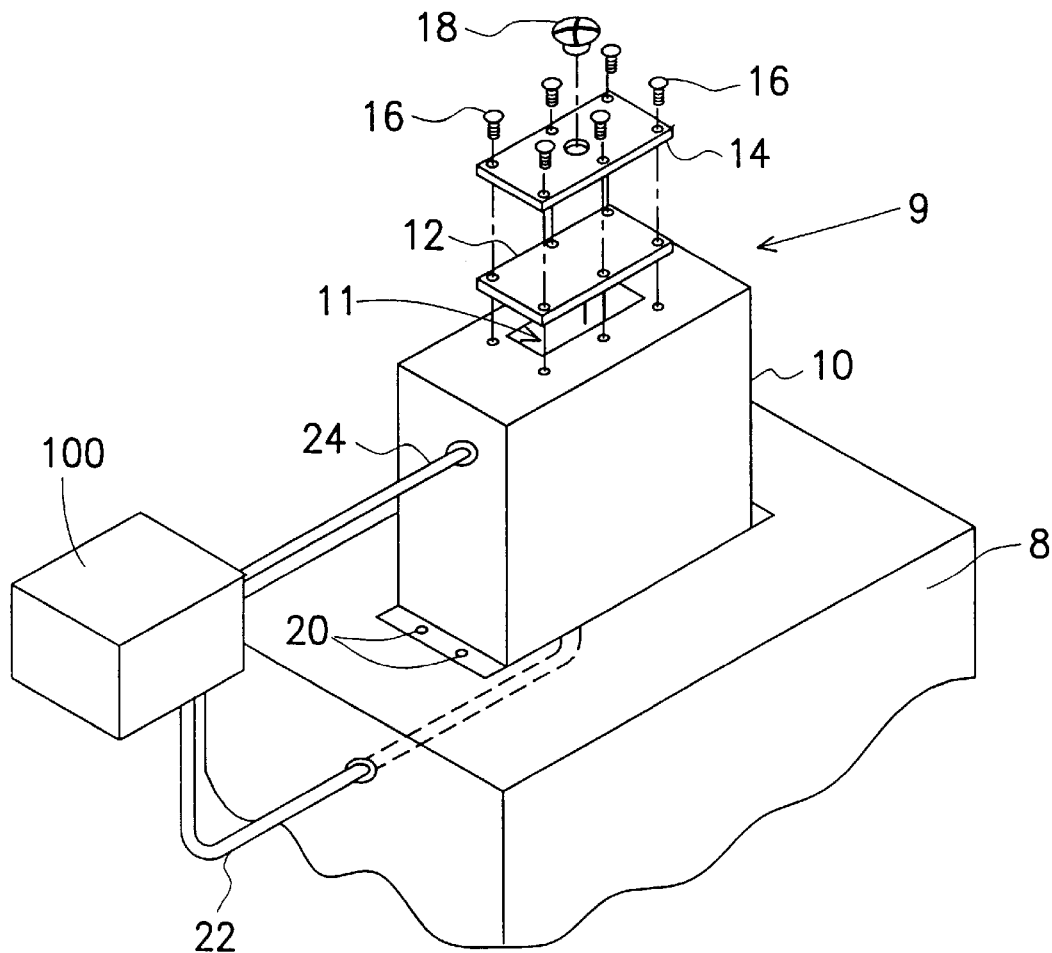
FIG. 3 illustrates the perspective view of an exploded conventional container of coolant.
Figure 4:
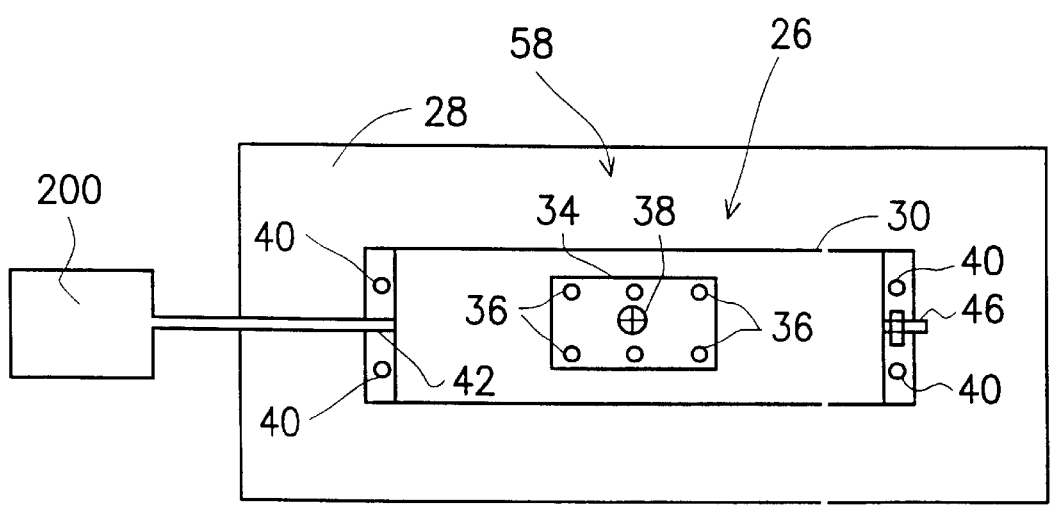
FIG. 4 illustrates the top view of a container of coolant according to the preferred embodiment of the invention.
Figure 5:
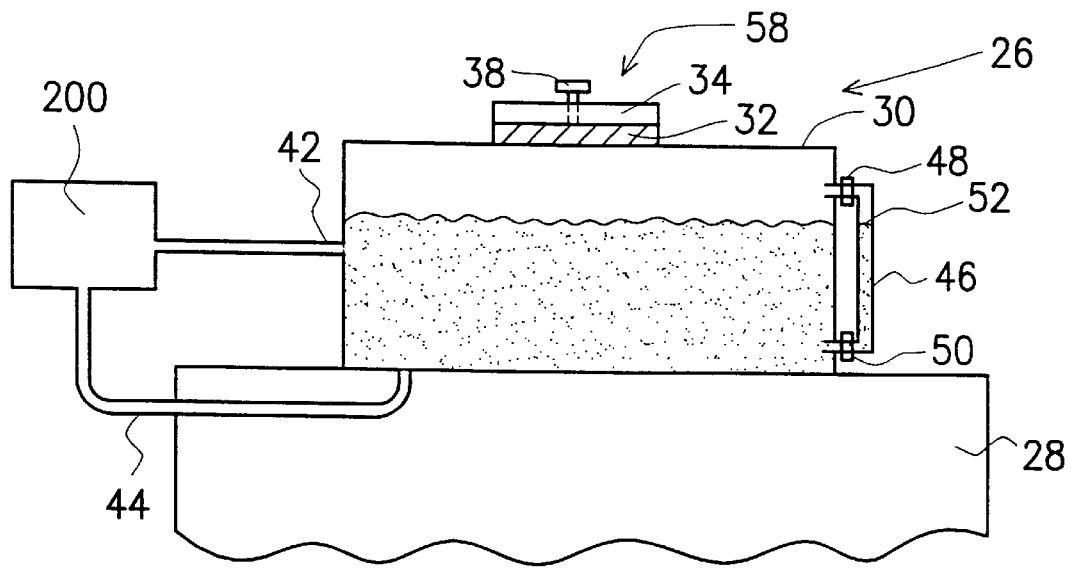
FIG. 5 illustrates the sectional view of a container of coolant according to the preferred embodiment of the invention.
Figure 6:
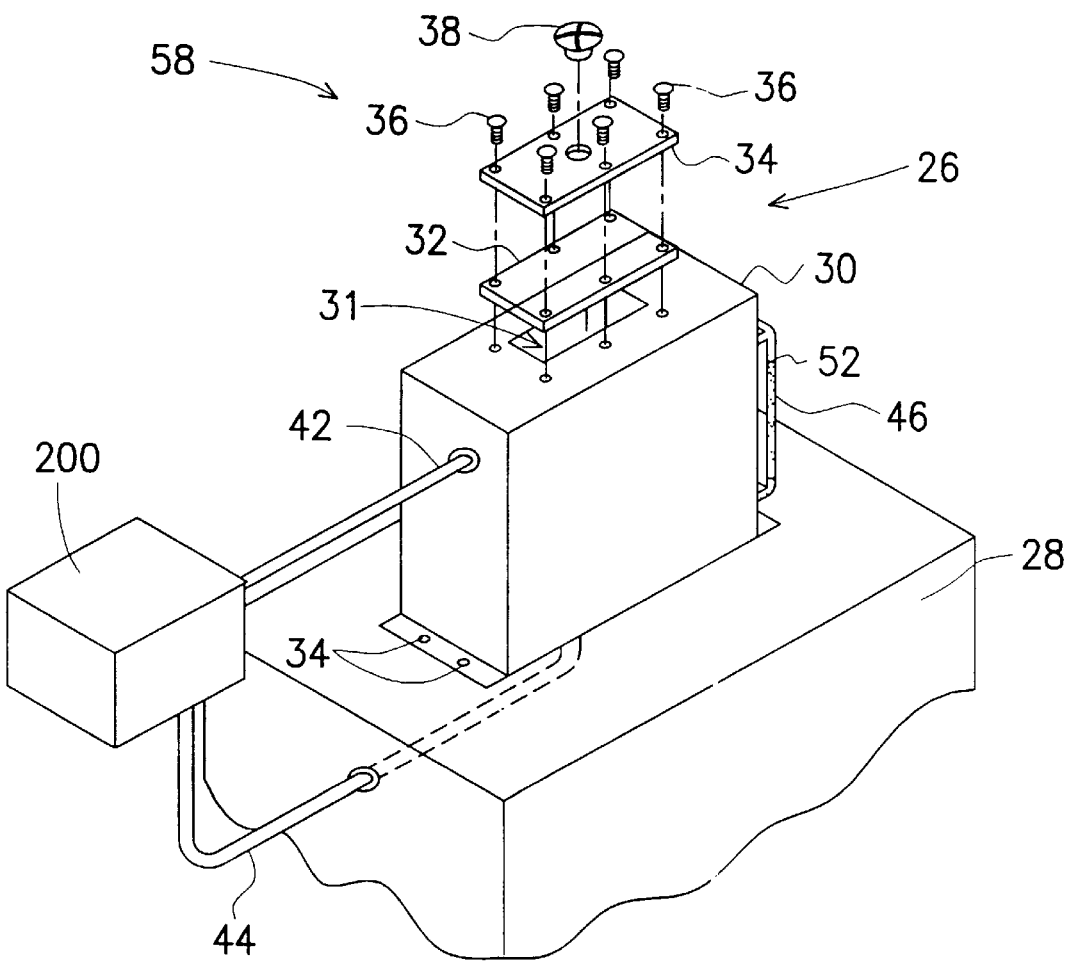
FIG. 6 illustrates the perspective view of an exploded container of coolant according to the preferred embodiment of the invention.

Referring to FIGS. 4–6, a container of coolant 26, according to the preferred embodiment of the invention, is used in a stepper 28. For example, The container of coolant 26 is mounted on machines of type 18, 19 and 110 of a NIKON™ stepper. The structure of the container of coolant 26 includes a storing container 30 with a top and a bottom, a transparent duct 46 and a covering apparatus 58, which is on the top of the storing container 30 and further includes an up-lifter 38, a metal plate 34, a washer 32 and a number of screws such as six screws 36. A coolant is stored inside the storing container 30 and the transparent duct 46. Preferably, the coolant is, for example, a chlorofluorocarbon such as Fren ($CCl_2F_2$) which is odorless, nonpoisonous, nonflammable and non-corrosive. The storing container 30 also includes a circulative input duct 44 and a circulative output 42, a coolant inlet 31 and a number of mounting holes such as four mounting holes 40. Preferably, the storing container 30 is made of, for example, stainless steel. The circulative input duct 44 and a circulative output 42 are to be connected to a coolant compressor 200 to complete a cycle of a circulation of the coolant. The coolant compressor 200 processes the coolant and drives the coolant in circulation through the circulative ducts 42, 44.

The container of coolant of the invention as mentioned above is working the same as the conventional one except the transparent duct 46. The assembling details about the conventional parts are not described here and please to refer to the prior art as described previously. The following is to describe the transparent duct 46.

The transparent duct 46 includes an upper open end 48 and a lower open end 50 and is vertically or slantingly mounted on the side through inside of the storing container 30. It is vertically mounted in the preferred embodiment of the invention. This is along the direction from the bottom to the top of the storing container 30. Because of the transparency, the transparent duct 46 allows a liquid level 52 of the coolant left inside the storing container 30 to be detected by eye directly or other straightforward methods. An operator, therefore, can easily obtain a status of the coolant to avoid problems of the stepper due to the insufficient coolant, which causes the temperature and humidity to be out of an acceptable range.

The transparent duct 46 is made of one such as PVC, plastic, resin or teflon ($C_2F_4$), which are transparent materials. The ends 48 of the transparent duct 46 can be screwed on the side of the storing container 30 and allow the coolant to freely flow through the transparent duct 46.

The invention has been described using exemplary preferred embodiment. However, it is to be understood that the scope of the invention is not limited to the disclosed embodiment. On the contrary, it is intended to cover various modifications and similar arrangements. The scope of the claims, therefore, should be accorded the broadest interpretation so as to encompass all such modifications and similar arrangements.

What is claimed is:

1. A coolant container for a stepper, comprising:

a container;

a chlorofluorocarbon coolant and a coolant inlet, the chlorofluorocarbon coolant contained in the container being odorless, nonpoisonous, nonflammable and non-corrosive;

a covering apparatus adapted to close the coolant inlet;

a transparent duct having lower and upper open ends which are connected to the container, the transparent duct being in communication with an inside of the container;

a coolant compressor adapted to circulate the coolant; and a circulative input duct and a circulative output duct which connect the coolant compressor to the container.

2. A coolant container according to claim 1, wherein the chlorofluorocarbon contains Fren ($CCl_2F_2$).

3. A coolant container according to claim 1, wherein the container includes a plurality of mounting holes through which the container is mounted on the stepper.

4. A coolant container according to claim 1, wherein the container is made of stainless steel.

5. A coolant container according to claim 1, wherein the covering apparatus includes a metal plate and a washer.

6. A coolant container according to claim 5, wherein the metal plate includes an up-lifter.

7. A coolant container for a stepper, comprising:

a container;

a chlorofluorocarbon coolant and a coolant inlet, the chlorofluorocarbon coolant contained in the container being odorless, nonpoisonous, nonflammable and non-corrosive;

a covering apparatus adapted to close the coolant inlet;

a transparent duct made of PVC having lower and upper open ends which are connected to the container, the PVC transparent duct being in communication with an inside of the container;

a coolant compressor adapted to circulate the coolant; and a circulative input duct and a circulative output duct which connect the coolant compressor to the container.

8. A coolant container for a stepper, comprising:

a container;

a chlorofluorocarbon coolant and a coolant inlet, the chlorofluorocarbon coolant contained in the container being odorless nonpoisonous, nonflammable and non-corrosive;

a covering apparatus adapted to close the coolant inlet;

a transparent duct made of plastic having lower and upper open ends which are connected to the container, the plastic transparent duct being in communication with an inside of the container;

a coolant compressor adapted to circulate the coolant; and a circulative input duct and a circulative output duct which connect the coolant compressor to the container.

9. A coolant container for a stepper, comprising:

a container;

a chlorofluorocarbon coolant and a coolant inlet, the chlorofluorocarbon coolant contained in the container being odorless, nonpoisonous, nonflammable and non-corrosive;

a covering apparatus adapted to close the coolant inlet;

a transparent duct made of resin having lower and upper open ends which are connected to the container, the resin transparent duct being in communication with an inside of the container;

a coolant compressor adapted to circulate the coolant; and a circulative input duct and a circulative output duct which connect the coolant compressor to the container.

10. A coolant container for a stepper, comprising:

a container;

a chlorofluorocarbon coolant and a coolant inlet, the chlorofluorocarbon coolant contained in the container being odorless, nonpoisonous, nonflammable and non-corrosive;

a covering apparatus adapted to close the coolant inlet;

a transparent duct made of teflon ($C_2F_4$) having lower and upper open ends which are connected to the container, the teflon ($C_2F_4$) transparent duct being in communication with an inside of the container;

a coolant compressor adapted to circulate the coolant; and a circulative input duct and a circulative output duct which connect the coolant compressor to the container.

* * * * *